United States Patent
Tsai et al.

(10) Patent No.: US 12,354,255 B2
(45) Date of Patent: Jul. 8, 2025

(54) IMAGE DEFECT DETECTING SYSTEM, GENERATION METHOD OF IMAGE DEFECT DETECTING SYSTEM AND NON-TRANSITORY COMPUTER READABLE MEDIUM

(71) Applicant: WISTRON CORP., New Taipei (TW)

(72) Inventors: Ya-Cheng Tsai, New Taipei (TW); Che-Wei Mei, New Taipei (TW)

(73) Assignee: WISTRON CORP., New Taipei (TW)

( * ) Notice: Subject to any disclaimer, the term of this patent is extended or adjusted under 35 U.S.C. 154(b) by 388 days.

(21) Appl. No.: 18/047,674

(22) Filed: Oct. 19, 2022

(65) Prior Publication Data

US 2024/0013369 A1   Jan. 11, 2024

(30) Foreign Application Priority Data

Jul. 6, 2022  (CN) .......................... 202210789123.2

(51) Int. Cl.
*G06T 7/00* (2017.01)

(52) U.S. Cl.
CPC .... *G06T 7/001* (2013.01); *G06T 2207/20081* (2013.01); *G06T 2207/30108* (2013.01)

(58) Field of Classification Search
CPC .......... G06T 7/001; G06T 2207/20081; G06T 2207/30108; G06T 2207/20084; G06T 2207/30164; G06T 7/0002; G06N 20/00; G06V 10/764
See application file for complete search history.

(56) References Cited

U.S. PATENT DOCUMENTS

| | | | |
|---|---|---|---|
| 9,946,944 B2 | 4/2018 | Yamazaki | |
| 10,341,374 B1* | 7/2019 | Sadaghiani | ........... G06F 18/217 |
| 2020/0051017 A1* | 2/2020 | Dujmic | ................. G06F 18/214 |
| 2021/0224606 A1 | 7/2021 | Lee et al. | |

FOREIGN PATENT DOCUMENTS

| | | |
|---|---|---|
| CN | 109671058 B | 4/2021 |
| CN | 114332008 A | 4/2022 |
| TW | I729861 B | 6/2021 |

OTHER PUBLICATIONS

TW Office Action dated Sep. 1, 2023 in Taiwan application No. 111127557.
IN Search Report dated May 7, 2025 in application No. 202334010196.

* cited by examiner

*Primary Examiner* — Samir A Ahmed
(74) *Attorney, Agent, or Firm* — McClure, Qualey & Rodack, LLP (57) ABSTRACT

A generation method of an image defect detecting system is provided. Said method includes: obtaining a plurality of validation difference scores respectively associated with a plurality of validation images based on a semi-supervised learning model; calculating a threshold value based on the plurality of validation difference scores; creating a standby inference model based on the plurality of validation difference scores; obtaining a testing difference score associated with a testing image based on the semi-supervised learning model; adjusting the threshold value by the standby inference model in response to the testing difference score and the threshold value; and outputting data comprising the testing difference score.

20 Claims, 5 Drawing Sheets

IMAGE DEFECT DETECTING SYSTEM, GENERATION METHOD OF IMAGE DEFECT DETECTING SYSTEM AND NON-TRANSITORY COMPUTER READABLE MEDIUM

CROSS-REFERENCE TO RELATED APPLICATIONS

This non-provisional application claims priority under 35 U.S.C. § 119(a) on Patent Application No(s). 202210789123.2 filed in China on, Jul. 6, 2022, the entire contents of which are hereby incorporated by reference.

BACKGROUND

1. Technical Field

The present disclosure relates to an image defect detecting system, a generation method thereof and a non-transitory computer readable medium, and particularly relates to an image defect detecting system, a generation method of the image defect detecting system and a non-transitory computer readable medium which may lower manpower needs and time costs.

2. Related Art

When automatic optical inspection (AOI) is performed, a machine learning model or a deep learning model of an image defect detecting system is usually trained by collecting images of products. However, before the training of the model is performed by using these images, these images need to be marked to elevate the performance of detection accuracy of the AOI detection model.

In order to mark these images, a conventional AOI detection procedure usually needs a large amount of labor to performing marking the images. Hence, how to lower the amount of the marking work is an important issue in this art. On the other hand, in a manufacturing process of lower probability of defective products, complex sorts of the defective products or beginning of AOI detection, it is not easy to collect and classify images of the defective products. In other words, under a condition that the ratio of the defective products is not high enough or the number of the defective products is not enough to sufficiently indicate all sorts of the defective products, it usually leads to a situation of having difficulty in training the model and causes AOI detection being unable to be rapidly introduced or even totally unable to be introduced.

Hence, related techniques of applying AOI detection still need to improve on the generation method of the image defect detecting system to lower manpower needs and time costs.

SUMMARY

In light of the above descriptions, the present disclosure provides an image defect detecting system, a generation method of the image defect detecting system and a non-transitory computer readable medium, which may be helpful to solve the problem that the generation of the image defect detecting system is completed by devoting a large amount of manpower needs and time costs.

According to one or more embodiment of the present disclosure, a generation method of an image defect detecting system includes: obtaining a plurality of validation difference scores respectively associated with a plurality of validation images based on a semi-supervised learning model; calculating a threshold value based on the plurality of validation difference scores; creating a standby inference model based on the plurality of validation difference scores; obtaining a testing difference score associated with a testing image based on the semi-supervised learning model; adjusting the threshold value by the standby inference model in response to the testing difference score and the threshold value; and outputting data comprising the testing difference score.

According to one or more embodiment of the present disclosure, an image defect detecting system includes a station device and a server. The station device is provided with an image capturing component. The server is communicatively connected to the station device and is provided with a semi-supervised learning model, a standby inference model and a threshold value. The server is configured to perform: obtaining a plurality of validation difference scores respectively associated with a plurality of validation images based on the semi-supervised learning model; calculating the threshold value based on the plurality of validation difference scores; creating the standby inference model based on the plurality of validation difference scores; obtaining a testing difference score associated with a testing image based on the semi-supervised learning model; adjusting the threshold value in response to the testing difference score and the threshold value; and outputting data comprising the testing difference score.

According to one or more embodiment of the present disclosure, a non-transitory computer readable medium stores a program and after a computing device loads and executes the program, the execution includes: obtaining a plurality of validation difference scores respectively associated with a plurality of validation images based on a semi-supervised learning model; calculating a threshold value based on the plurality of validation difference scores; creating a standby inference model based on the plurality of validation difference scores; obtaining a testing difference score associated with a testing image based on the semi-supervised learning model; adjusting the threshold value by the standby inference model in response to the testing difference score and the threshold value; and outputting data comprising the testing difference score.

The aforementioned context of the present disclosure and the detailed description given herein below are used to demonstrate and explain the concept and the spirit of the present application and provides the further explanation of the claim of the present application.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present application. The following embodiments further illustrate various aspects of the present application, but are not meant to limit the scope of the present application.

Figure 1:
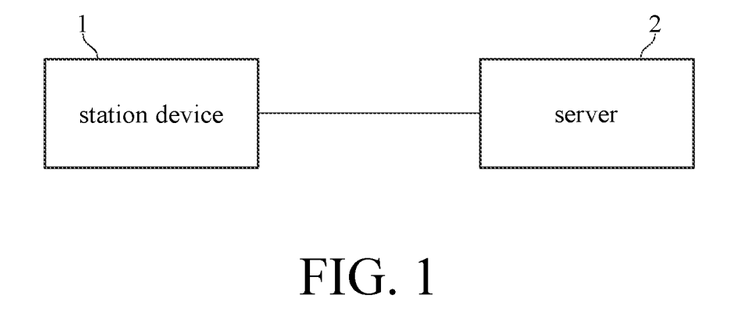
FIG. 1 illustrates a structure diagram of an image defect detecting system according to one embodiment of the present disclosure.

In the following embodiments, the present disclosure is embodied on AOI detection of electronic products as an example, but the embodied subjects of the present disclosure are not limited thereto. In addition, a generation method of an image defect detecting system according to one embodiment of the present disclosure is embodied in an image defect detecting system. The image defect detecting system may comprise operation content of image obtaining, data pre-processing, model generation and image classification etc. finished by a single device. However, as illustrated in FIG. 1 which illustrates a structure diagram of an image defect detecting system according to one embodiment of the present disclosure, the image defect detecting system may comprise a station device 1 and a server 2. The station device 1 is communicatively connected to the server 2 and is provided with an image capturing component. When the generation method of the image defect detecting system is performed, the station device 1 performs the image obtaining and the image classification, and the server 2 performs the data pre-processing, the model generation and parameter adjustment. Or, the image defect detecting system may comprise more hardware components to perform the generation method of an image defect detecting system. In the following description, the image defect detecting system comprising the station device 1 and the server 2 is taken for example, but the present disclosure is not limited thereto.

Figure 2:
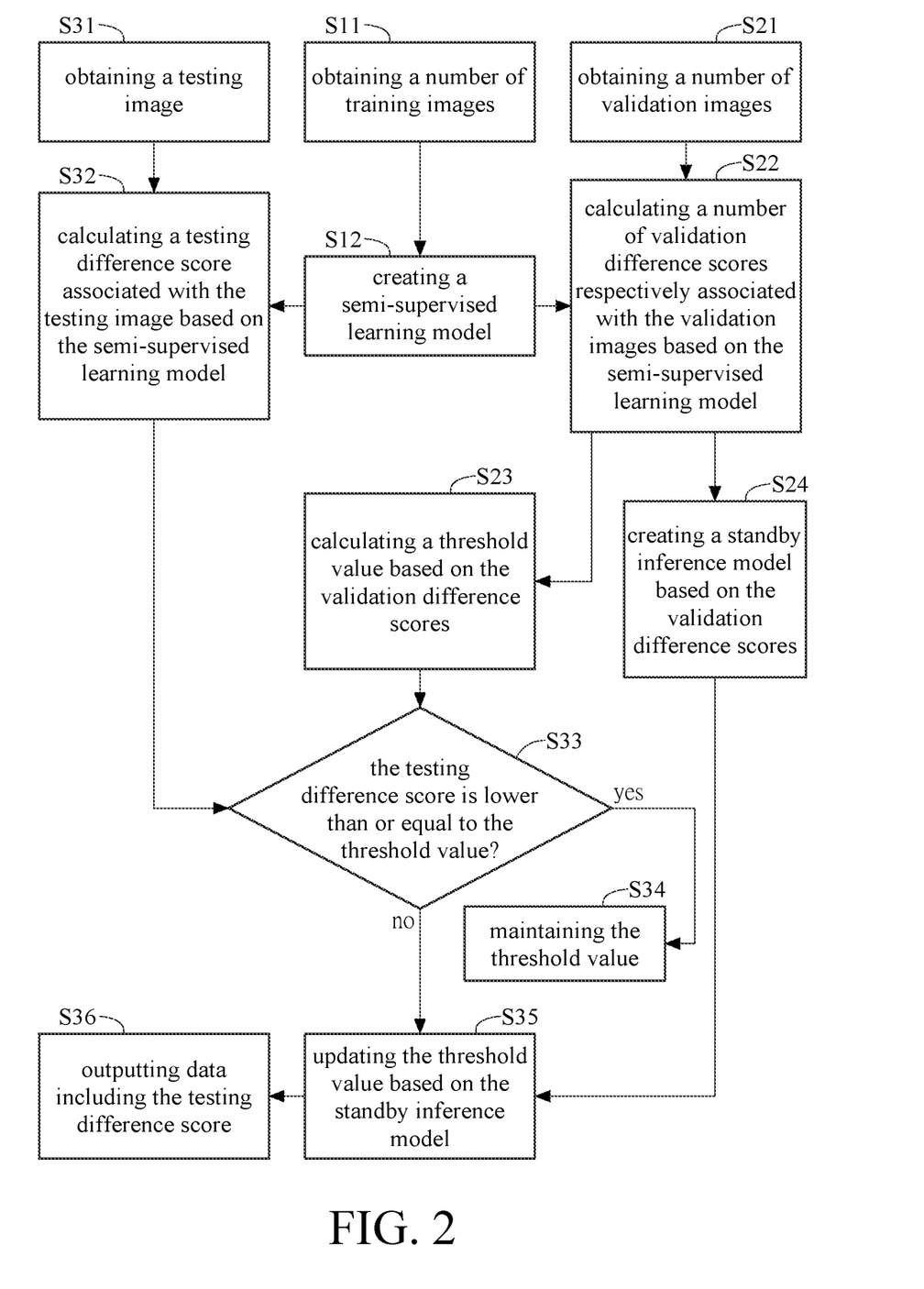
FIG. 2 illustrates a flowchart of a generation method of an image defect detecting system according to one embodiment of the present disclosure.

Please refer to FIG. 2, which illustrates a flowchart of a generation method of an image defect detecting system according to one embodiment of the present disclosure. In the present embodiment, the generation method of the image defect detecting system is mainly classified into a training stage, a validation stage and a testing stage, wherein the training stage is that semi-supervised learning is performed by a number of training images to obtain a semi-supervised learning model; the validation stage is that a number of testing difference scores are obtained by a number of validation images based on the aforementioned semi-supervised learning model and a threshold value is calculated accordingly to determine whether a product in an image is a non-defective product based on the threshold value; and the testing stage is that estimation is further performed on at least one testing image by the threshold value, and the threshold value is adaptively adjusted to meet a detection requirement under a condition that that there are too many defective products. In FIG. 2, step S11 and step S12 correspond to the aforementioned training stage; step S21 to step S24 correspond to the aforementioned validation stage; step S31 to step S35 correspond to the aforementioned testing stage. In addition, the program corresponding to these steps may be stored on a non-transitory computer readable to finish the generation method of the image defect detecting system after a computing device (for example, image defect detecting system of the present embodiment) loads and executes the program.

In step S11, the station device 1 obtains the training images, wherein the products included in these training images are non-defective products and are served as positive sample images for performing the following model training. Said training images may be images after the server 2 performs data pre-processing (such as grayscale transformation, skew calibration, specification normalization procedures, etc.). The number of the aforementioned training images is not limited in the present disclosure, and the number of the aforementioned training images may be less than a number of samples used by a general supervised learning under actual factors of the usage situations. For example, in step S11, only 50 training images need to be obtained.

Figure 3:
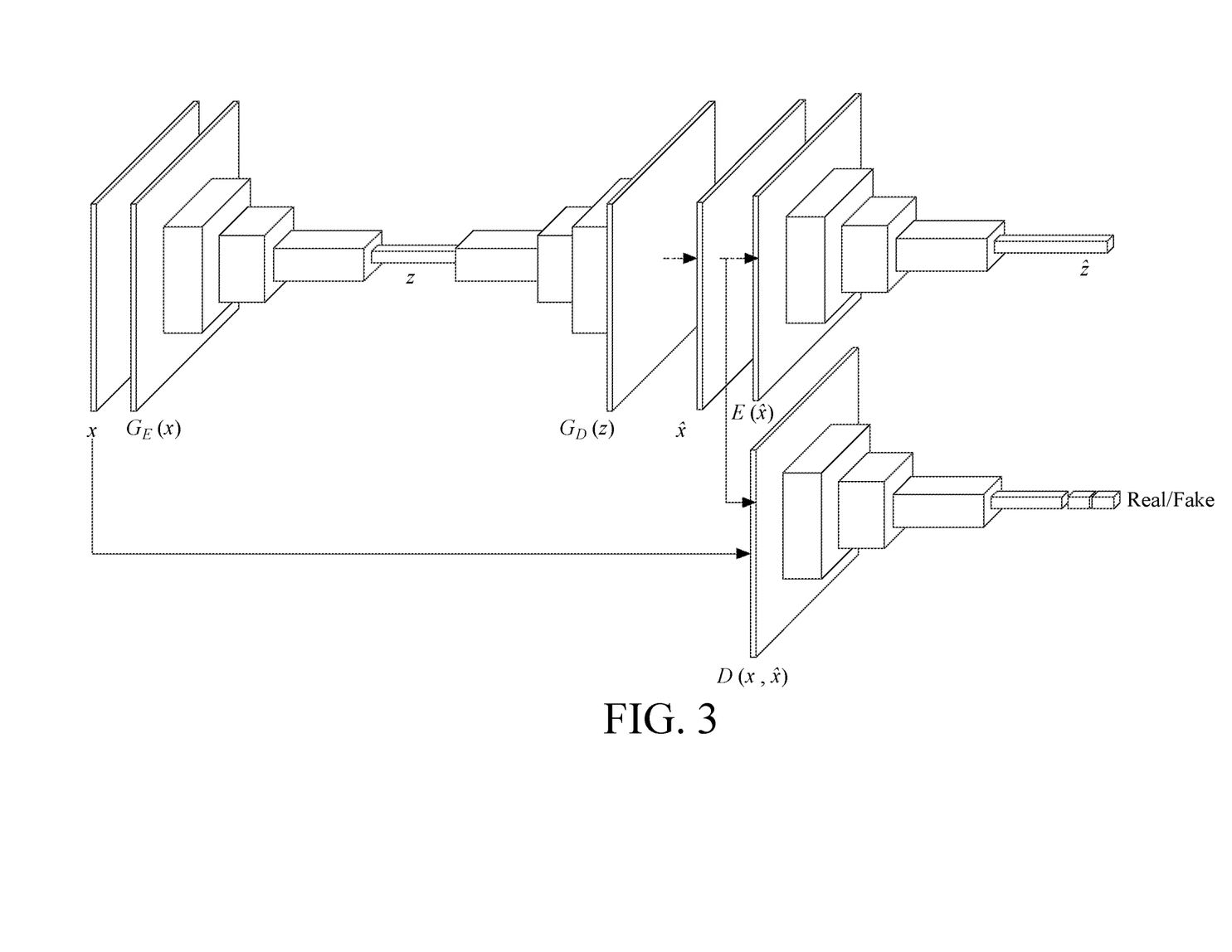
FIG. 3 illustrates a schematic structure diagram of a generative adversarial network anomaly model (GANomaly model) of a generation method of an image defect detecting system according to one embodiment of the present disclosure.

In step S12, the semi-supervised learning model is created by the aforementioned training images. In the present embodiment, step S12 may be performed by the server 2 and the semi-supervised learning model is implemented by a generative adversarial network anomaly model (GANomaly model). In detail, FIG. 3 illustrates a schematic structure diagram of a GANomaly model of a generation method of an image defect detecting system according to one embodiment of the present disclosure, wherein x shown in FIG. 3 represents any one of the aforementioned training images and passes through a first encoder $G_E(x)$ to obtain a first feature vector z, and the first feature vector z passes through a decoder $G_D(z)$ to obtain a reconstructed image $\hat{x}$, and the reconstructed image $\hat{x}$ passes through a second encoder $E(\hat{x})$ for performing a second encoding to obtain a second feature vector $\hat{z}$. During training, the generated first feature vector z is made to be as close as possible to the second feature vector $\hat{z}$ (that is, the loss function is low enough), such that effects of a generator G in the generative adversarial network is generated. And then, the training image x and the reconstructed image $\hat{x}$ are sent to the identifying component D(x, $\hat{x}$) for training to obtain a result of whether image content is authentic or fake. Finally, the ideal generator G and the ideal identifying component D are obtained through repeating adversary, and the effect of binding the feature vectors z, $\hat{z}$ and the images x, $\hat{x}$ generated by encoding and decoding is achieved at the same time. The aforementioned GANomaly model is one way of implementing the semi-supervised learning model and is not intended to limit the present application, and the semi-supervised learning model may also be created by the other methods.

After the semi-supervised learning model is obtained by steps S11 and S12, the generation method of the image defect detecting system according to one embodiment of the present disclosure further comprises the following step S21 to step S24 to generate a threshold value for determining non-defective products and at the same time creating a standby inference model to provide a function of adaptively adjusting the threshold value in the subsequent testing stage.

Please refer to FIG. 2 and FIG. 3 together, in step S21, similar to step S11, the station device 1 obtains validation images or the server 2 obtains validation images already performed with data-preprocessed, and the products included in the validation images are non-defective products to serve as positive sample images for performing the following validation of the threshold value. Similarly, the number of the aforementioned validation images is not intended to limit the present disclosure, and the number of the aforementioned validation images may be less than a number of samples used by a general supervised learning under actual factors of usage situations. For example, in step S21, only 20 validation images need to be obtained.

And then, in step S22, the server 2 obtains a number of validation difference scores respectively associated with the validation images based on the semi-supervised learning model. In detail, if the semi-supervised learning model is the GANomaly model, the server 2 then may calculate a difference distance between the first feature vector z of each validation image x and a second feature vector $\hat{z}$ of a corresponding reconstructed image $\hat{x}$ as an validation difference score. For example, L1-norm measure may be performed on the first feature vector z and the second feature vector $\hat{z}$, i.e. a sum of a difference of two squares of the first feature vector z and the second feature vector $\hat{z}$, to calculate the validation difference score of the validation image. In other words, the validation difference scores associated with the validation images may be obtained by performing step S22. If step S22 is performed by a semi-supervised learning model not created by the GANomaly model, similarly, other encoder may be used to respectively perform dimension reduction encoding on the validation images and the reconstructed image generated by the semi-supervised learning model, and the difference distance between the feature vector representing the validation image and the feature vector representing the reconstructed image as the validation difference score.

In step S23, the threshold value is calculated based on these validation difference scores. In one embodiment, an average value of these validation difference scores serves as the threshold value. The threshold value is served as a standard for when the aforementioned semi-supervised learning model is used subsequently to perform determination on a new input image to determine whether a difference distance between a feature vector of the input image and a feature vector of the corresponding reconstructed image conforms to a threshold requirement. When the difference distance is lower than the threshold value, the input image may be regarded as the positive sample image which conforms to the threshold demand. i.e. the product in the image is the non-defective product.

In addition, in step S24, a standby inference model is further created based on the validation difference scores. In detail, this step is used to find another standby value based on the aforementioned validation difference scores to provide a function of adaptively adjusting the threshold value by said another standby value in the following testing stage. In one embodiment, the standby inference model is created by a one class support vector machine algorithm based on these validation difference scores, and the standby inference model can decide a boundary range for distinguishing positive sample difference scores (not a single value), and the average value of the boundary range serves as said boundary value.

After obtaining the threshold value and the standby inference model through the abovementioned step S21 to step S24, subsequent step S31 to step S35 may be performed to actually determine whether a product in the testing image is a non-defect product by the semi-supervised learning model and the threshold value. The generation method of the image defect detecting system of an embodiment of the present disclosure further includes the following step S21 to step S24 to generate a threshold value for determining a non-defective product and at the same time create a standby inference model for adaptively adjusting the threshold value in the subsequent testing stage.

Please refer to FIG. 2 again, in step S31, similar to step S11 or step S21, the station device 1 may obtain a testing image, or the server 2 may obtain the testing image performed with data-preprocessing, and the product included in this testing image is a product to be tested, and is not limited to a non-defective product or a defective product according to human testing standards. Then, in step S32, the method of step S22 may be used to calculate a testing difference score associated with this testing image based on the aforementioned semi-supervised learning model. In an embodiment, the feature vector of the testing image is calculated, the feature vector of the reconstructed image corresponding to this testing image is calculated, and the difference distance between these two feature vectors is served as the testing difference score.

In step S33, the server determines whether this testing difference score is lower than or equal to the threshold value. If the result of the determination is "yes" (i.e. the testing difference score is lower than or equal to the threshold value), it means the product included in the testing image is determined as a non-defective product, and performing determination on the testing image to determine whether the product included in the testing image is a non-defective product according to this threshold value is reasonable. Then, step S34 may be performed to maintain this threshold value without adjustment. On the contrary, if the result of the determination is "no" (i.e. the testing difference score is larger than the threshold value), it means the product included in the testing image is determined as a defective product. Then, step S35 may be performed to adaptively adjust this threshold value.

Figure 4:
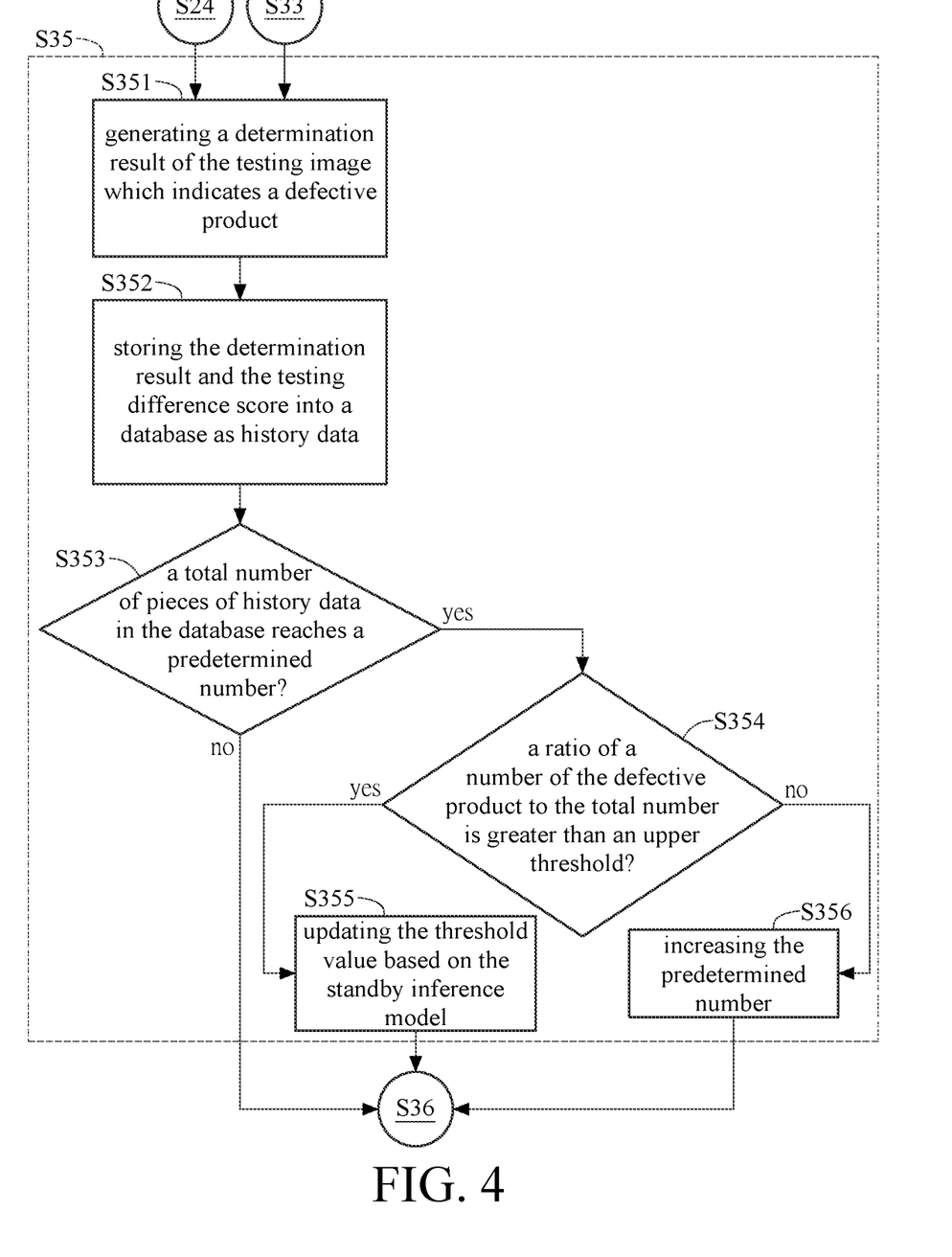
FIG. 4 illustrates a detailed flowchart of step S35 of a generation method of an image defect detecting system according to one embodiment of the present disclosure.

In step S35, under the situation where the determination result of step S33 is "no", the server further selectively uses the standby value searched by the standby inference model built with step S24 to adjust the threshold value. In an embodiment, this image defect detecting system may use the result of whether a non-defective product is determined based on the testing image as one piece of history data and storing the one piece of history data into a database. When a number of pieces of history data reaches a predetermined number (for example, 1000), the server may determine whether a number of defective products among all the piece of history data relative to this predetermined number is reasonable (for example, it is considered to be unreasonable if the number of defective products is higher than an upper threshold value of the predetermined number). In detail, in this embodiment, in step S34, except for maintaining the threshold value, the determination result of the testing image indicating a non-defective product is further generated, and this step S35 may further include the following sub-steps: sub-step S351, generating the determination result of the testing image indicating a defective product; sub-step S352, storing the determination result of the testing image and the testing difference score into the database as the history data; sub-step S353, determining whether a total number of pieces of history data in the database reaches a predetermined number, and directly performing step S36 when the total number reaches the predetermined number; sub-step S354, when the total number reaches the predetermined number, further determining whether a ratio of a number of pieces of history data comprising a defective product in the database to the total number is greater than the upper threshold value; sub-step S355, adjusting the threshold value by the standby inference model built with when determining that the ratio is greater than the threshold value, and continuing performing step S36; sub-step S356, increasing the predetermined number when the ratio is not higher than the upper threshold value, and continuing performing step S36. In sub-step S356, the predetermined number may be adjusted from, for example, 1000 to 5000 to determine again whether the number of defective products is reasonable when a total number of pieces of history data reaches the increased predetermined number, for the server to still be able to adaptively adjust the threshold value with the standby value found by the standby inference model. Step S33 to step S35 described above may also be understood as step of the server 2 "adjusting the threshold value by the standby inference model in response to the testing difference score and the threshold value".

In step S36, data associated with this image defect detecting system is outputted, for example, the threshold value, the testing difference score and file name of the testing image, determination result indicating whether a non-defective product exists etc., and may further include false alarm rate and miss alarm rate. In an embodiment, the false alarm rate is a number of positive samples being falsely reported as defective products divided by a total number of positive samples, and the miss alarm rate is a number of defective products being falsely reported as positive samples divided by a total number of defective products. Through the testing difference score of the testing image, it may be known which position of the distribution of the validation difference scores that the difference score of the testing image (unknown sample) after the same calculation falls at. At the presentation interface of this step S36, except for presenting the above data in a form of a list, a testing difference score-number graph/histogram may also be used to present a relationship between the testing difference score and the number in the history data, and the position of the threshold value in the testing difference scores may also be marked in the diagram. In addition, after step S36, a modification command regarding the threshold value may also be received from the user.

Figure 5A:
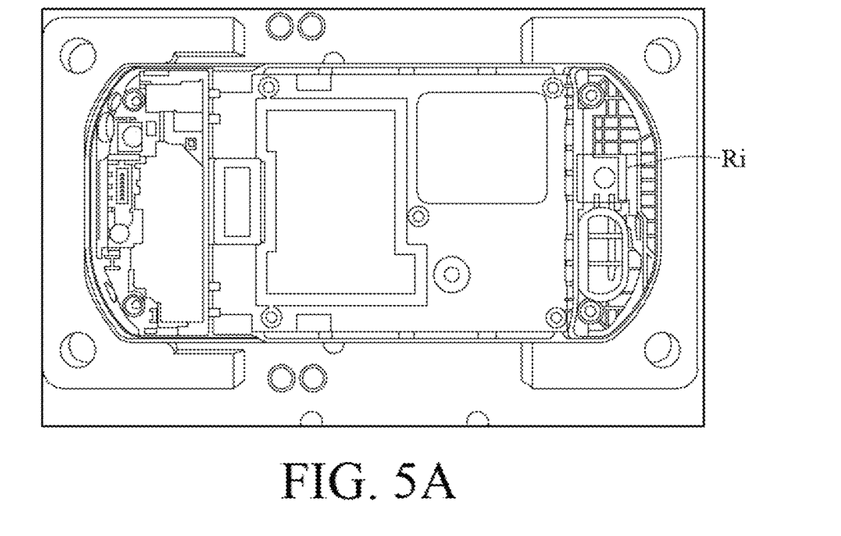
FIG. 5A illustrates an exemplary product diagram of detection performed by the generated image defect detecting system according to one embodiment of the present disclosure.
Figure 5B:
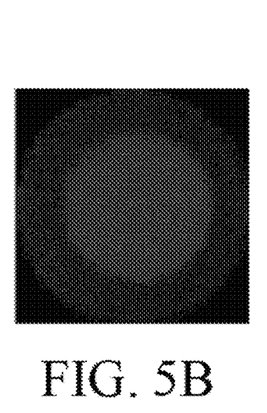
FIG. 5B to FIG. 5C illustrate exemplary image diagrams of determining that an image of a region of interest conforms to a detection requirement by the generated image defect detecting system according to one embodiment of the present disclosure.
Figure 5C:
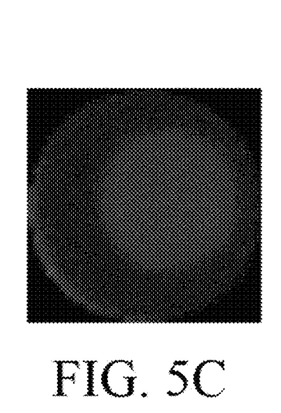
Figure 5D:
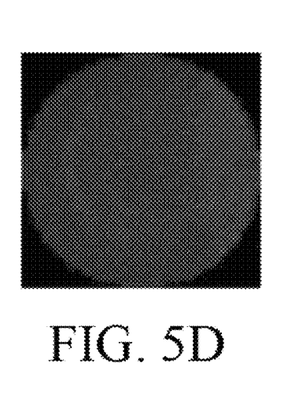
FIG. 5D to FIG. 5F illustrate exemplary image diagrams of determining that an image of a region of interest does not conform to a detection requirement by the generated image defect detecting system according to one embodiment of the present disclosure.
Figure 5E:
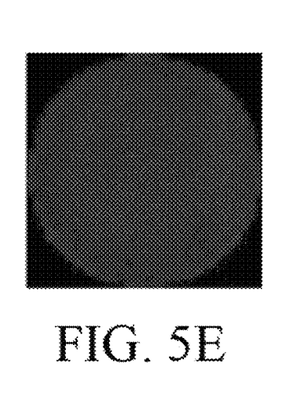
Figure 5F:
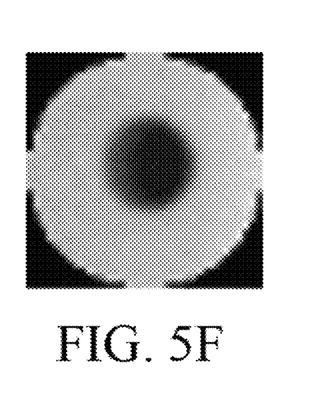

Please refer to FIG. 5A, which illustrates an exemplary product diagram of detection performed by the generated image defect detecting system according to one embodiment of the present disclosure, wherein the illustrated region of interest Ri circles a part of the product that is to be examined for defect. In this example, the image defect detecting system is for detecting whether a foam is actually installed on the waterproof ring of the mobile device. Please refer to FIGS. 5B and 5C, which illustrate exemplary image diagrams of determining that an image of the region of interest Ri conforms to a detection requirement by the generated image defect detecting system according to one embodiment of the present disclosure; on the contrary, please refer to FIGS. 5D, 5E and 5F, which illustrate exemplary image diagrams of determining that the region of interest Ri does not conform to a detection requirement by this image defect detecting system.

In view of the above, through the embodiment of the generation method of the image defect detecting system, requirements such as the required manpower and waiting time etc. may be reduced by the characteristics of the semi-supervised learning model, and the automatic determination of the threshold value may be greatly improved, which avoids the subjective influence of the inspector's decision which purely relies on performing detection with naked eyes, and the deployment of the inference model is also speeded up.

Although embodiments of the present application are disclosed as described above, they are not intended to limit the present application, and a person having ordinary skill in the art, without departing from the spirit and scope of the present application, can make some changes in the shape, structure, feature and spirit described in the scope of the present application. Therefore, the scope of the present application shall be determined by the scope of the claims.

What is claimed is:

1. A generation method of an image defect detecting system, comprising:
   obtaining a plurality of validation difference scores respectively associated with a plurality of validation images based on a semi-supervised learning model;
   calculating a threshold value based on the plurality of validation difference scores;
   creating a standby inference model based on the plurality of validation difference scores;
   obtaining a testing difference score associated with a testing image based on the semi-supervised learning model;
   adjusting the threshold value by the standby inference model in response to the testing difference score and the threshold value; and
   outputting data comprising the testing difference score;
   wherein each of a plurality of validation difference scores and the testing difference score is a difference distance between a first feature vector and a second feature vector, the first feature vector is generated by a server according to the one of the plurality of validation images or the testing image, the second feature vector is generated by the server according to a reconstructed image generated by the semi-supervised learning model;
   wherein the data comprises at least one of the threshold value, the testing difference score, a file name of the testing image, a determination result indicating whether a non-defective product exists, a false alarm rate and a miss alarm rate;
   wherein adjusting the threshold value in response to the testing difference score and the threshold value comprises:
   determining whether the testing difference score is lower than or equal to the threshold value;
   maintaining the threshold value when the testing difference score is lower than or equal to the threshold value; and
   adjusting the threshold value based on the standby inference model when the testing difference is greater than the threshold value:
   generating a determination result of the testing image which indicates a non-defective product when the testing difference score is lower than or equal to the threshold value:
   generating the determination result of the testing image which indicates a defective product;
   regarding the determination result and the testing difference score as history data and storing the history data into a database;
   determining whether a total number of pieces of history data in the database reaches a predetermined number;

determining whether a ratio of a number of pieces of history data comprising a defective product in the database to the total number is greater than an upper threshold value when the total number reaches the predetermined number; and adjusting the threshold value based on the standby inference model when determining that the ratio is greater than the threshold value.

2. The generation method of the image defect detecting system according to claim 1, further comprising inputting a plurality of training images to an anomaly detection model based on a generative adversarial network to create the semi-supervised learning model.

3. The generation method of the image defect detecting system according to claim 1, wherein obtaining the plurality of validation difference scores respectively associated with the plurality of validation images based on the semi-supervised learning model comprises:
inputting the plurality of validation images to the semi-supervised learning model to obtain a plurality of reconstructed images respectively corresponding to the plurality of validation images;
obtaining a plurality of first feature vectors respectively corresponding to the plurality of validation images;
obtaining a plurality of second feature vectors respectively corresponding to the plurality of reconstructed images; and
calculating a sum of a difference of two squares between each of the plurality of first feature vectors and a corresponding one of the plurality of second feature vectors as the plurality of validation difference scores.

4. The generation method of the image defect detecting system according to claim 1, wherein calculating the threshold value based on the plurality of validation difference scores comprises: calculating an average value of the plurality of validation difference scores as the threshold value.

5. The generation method of the image defect detecting system according to claim 1, wherein creating the standby inference model based on the plurality of validation difference scores comprises: utilizing a one class support vector machine algorithm to create the standby inference model based on the plurality of validation difference scores.

6. The generation method of the image defect detecting system according to claim 5, wherein adjusting the threshold value by the standby inference model comprises: utilizing the one class support vector machine algorithm to calculate a boundary value which divides the plurality of validation difference scores into two groups and adjusting the threshold value to the boundary value.

7. The generation method of the image defect detecting system according to claim 1, wherein the data further comprises: a file name of the testing image, a determination result of the testing image which indicates a non-defective product or a defective product and the threshold value.

8. The generation method of the image defect detecting system according to claim 1, further comprising: generating a determination result of the testing image which indicates a non-defective product when the testing difference score is lower than or equal to the threshold value;
wherein adjusting the threshold value by the standby inference model comprises:
generating the determination result of the testing image which indicates a defective product;
regarding the determination result and the testing difference score as history data and storing the history data into a database;
determining whether a total number of pieces of history data in the database reaches a predetermined number;
determining whether a ratio of a number of pieces of history data comprising a defective product in the database to the total number is greater than an upper threshold value when the total number reaches the predetermined number; and
increasing the predetermined number when determining that the ratio is not greater than the upper threshold value.

9. An image defect detecting system comprising:
a station device provided with an image capturing component; and
a server communicatively connected to the station device and provided with a semi-supervised learning model, a standby inference model and a threshold value;
wherein the server is configured to perform: obtaining a plurality of validation difference scores respectively associated with a plurality of validation images based on the semi-supervised learning model; calculating the threshold value based on the plurality of validation difference scores; creating the standby inference model based on the plurality of validation difference scores; obtaining a testing difference score associated with a testing image based on the semi-supervised learning model; adjusting the threshold value by the standby inference model in response to the testing difference score and the threshold value; and outputting data comprising the testing difference score;
wherein each of a plurality of validation difference scores and the testing difference score is a difference distance between a first feature vector and a second feature vector, the first feature vector is generated by a server according to the one of the plurality of validation images or the testing image, the second feature vector is generated by the server according to a reconstructed image generated by the semi-supervised learning model;
wherein the data comprises at least one of the threshold value, the testing difference score, a file name of the testing image, a determination result indicating whether a non-defective product exists, a false alarm rate and a miss alarm rate;
wherein adjusting the threshold value in response to the testing difference score and the threshold value comprises:
determining whether the testing difference score is lower than or equal to the threshold value;
maintaining the threshold value when the testing difference score is lower than or equal to the threshold value; and
adjusting the threshold value based on the standby inference model when the testing difference is greater than the threshold value:
generating a determination result of the testing image which indicates a non-defective product when the testing difference score is lower than or equal to the threshold value:
generating the determination result of the testing image which indicates a defective product;
regarding the determination result and the testing difference score as history data and storing the history data into a database;
determining whether a total number of pieces of history data in the database reaches a predetermined number;
determining whether a ratio of a number of pieces of history data comprising a defective product in the database to the total number is greater than an upper threshold value when the total number reaches the predetermined number; and adjusting the threshold value based on the standby inference model when determining that the ratio is greater than the threshold value.

10. The image defect detecting system according to claim 9, wherein the semi-supervised learning model is an anomaly detection model based on a generative adversarial network.

11. The image defect detecting system according to claim 9, wherein the server inputs the plurality of validation images to the semi-supervised learning model to obtain a plurality of reconstructed images respectively corresponding to the plurality of validation images; obtains a plurality of first feature vectors respectively corresponding to the plurality of validation images; obtains a plurality of second feature vectors respectively corresponding to the plurality of reconstructed images; and calculates a sum of a difference of two squares between each of the plurality of first feature vectors and a corresponding one of the plurality of second feature vectors as the plurality of validation difference scores respectively associated with the plurality of validation images.

12. The image defect detecting system according to claim 9, wherein the threshold value calculated based on the plurality of validation difference scores is an average value of the plurality of validation difference scores.

13. The image defect detecting system according to claim 9, wherein the standby inference model created based on the plurality of validation difference scores is the standby inference model created by a one class support vector machine algorithm based on the plurality of validation difference scores.

14. The image defect detecting system according to claim 13, wherein the threshold value adjusted by the standby inference model is a boundary value calculated by utilizing the one class support vector machine algorithm which divides the plurality of validation difference scores into two groups.

15. The image defect detecting system according to claim 9, wherein the data further comprises: a file name of the testing image, a determination result of the testing image which indicates a non-defective product or a defective product and the threshold value.

16. The image defect detecting system according to claim 9, wherein the server is further configured to perform: generating a determination result of the testing image which indicates a non-defective product when the testing difference score is lower than or equal to the threshold value; and wherein adjusting the threshold value by the standby inference model performed by the server comprises:

generating the determination result of the testing image which indicates a defective product;

serving the determination result and the testing difference score as history data and storing the history data into a database;

determining whether a total number of pieces of history data in the database reaches a predetermined number;

determining whether a ratio of a number of pieces of history data comprising a defective product in the database to the total number is greater than an upper threshold value when the total number reaches the predetermined number; and increasing the predetermined number when determining that the ratio is not greater than the threshold value.

17. A non-transitory computer readable medium storing a program and after a computing device loads and executes the program, the execution comprising:

obtaining a plurality of validation difference scores respectively associated with a plurality of validation images based on a semi-supervised learning model;

calculating a threshold value based on the plurality of validation difference scores;

creating a standby inference model based on the plurality of validation difference scores;

obtaining a testing difference score associated with a testing image based on the semi- supervised learning model;

adjusting the threshold value by the standby inference model in response to the testing difference score and the threshold value; and outputting data comprising the testing difference score;

wherein each of a plurality of validation difference scores and the testing difference score is a difference distance between a first feature vector and a second feature vector, the first feature vector is generated by a server according to the one of the plurality of validation images or the testing image, the second feature vector is generated by the server according to a reconstructed image generated by the semi-supervised learning model;

wherein the data comprises at least one of the threshold value, the testing difference score, a file name of the testing image, a determination result indicating whether a non-defective product exists, a false alarm rate and a miss alarm rate;

wherein adjusting the threshold value in response to the testing difference score and the threshold value comprises:

determining whether the testing difference score is lower than or equal to the threshold value;

maintaining the threshold value when the testing difference score is lower than or equal to the threshold value; and adjusting the threshold value based on the standby inference model when the testing difference is greater than the threshold value:

generating a determination result of the testing image which indicates a non-defective product when the testing difference score is lower than or equal to the threshold value:

generating the determination result of the testing image which indicates a defective product;

regarding the determination result and the testing difference score as history data and storing the history data into a database;

determining whether a total number of pieces of history data in the database reaches a predetermined number;

determining whether a ratio of a number of pieces of history data comprising a defective product in the database to the total number is greater than an upper threshold value when the total number reaches the predetermined number; and adjusting the threshold value based on the standby inference model when determining that the ratio is greater than the threshold value.

18. The non-transitory computer readable medium according to claim 17, further performing: inputting a plurality of training images to an anomaly detection model based on a generative adversarial network to create the semi-supervised learning model.

19. The non-transitory computer readable medium according to claim 17, wherein obtaining the plurality of validation difference scores respectively associated with the plurality of validation images based on the semi-supervised learning model comprises:
- inputting the plurality of validation images to the semi-supervised learning model to obtain a plurality of reconstructed images respectively corresponding to the plurality of validation images;
- obtaining a plurality of first feature vectors respectively corresponding to the plurality of validation images;
- obtaining a plurality of second feature vectors respectively corresponding to the plurality of reconstructed images; and
- calculating a sum of a difference of two squares between each of the plurality of first feature vectors and a corresponding one of the plurality of second feature vectors as the plurality of validation difference scores.

20. The non-transitory computer readable medium according to claim 17, wherein calculating the threshold value based on the plurality of validation difference scores comprises: calculating an average value of the plurality of validation difference scores to serve the average value as the threshold value;
- wherein creating the standby inference model based on the plurality of validation difference scores comprises: utilizing a one class support vector machine algorithm to create the standby inference model based on the plurality of validation difference scores.

* * * * *